United States Patent [19]

Segal

[11] Patent Number: 4,532,072

[45] Date of Patent: Jul. 30, 1985

[54] PROCESS FOR PRODUCING ALUMINIUM CONTAINING SOLS

[75] Inventor: David L. Segal, Didcot, England

[73] Assignee: United Kingdom Atomic Energy Authority, London, England

[21] Appl. No.: 551,204

[22] Filed: Nov. 14, 1983

[30] Foreign Application Priority Data

Nov. 25, 1982 [GB] United Kingdom ............... 8233690

[51] Int. Cl.$^3$ ............................................. B01J 13/00
[52] U.S. Cl. ............................... 252/313.1; 423/625; 423/630
[58] Field of Search ............................. 423/625, 630; 252/313.1

[56] References Cited

U.S. PATENT DOCUMENTS 2,805,920  9/1957  Richardson ..................... 423/630
3,056,725 10/1962  Rinse et al. ..................... 423/630

FOREIGN PATENT DOCUMENTS 160696   9/1952  Australia ........................ 423/630
223309  11/1958  Australia ........................ 423/630
239158   1/1960  Australia ........................ 423/630
1903066  9/1970  Fed. Rep. of Germany ...... 423/630
760081  10/1956  United Kingdom ............... 423/630
931936   7/1963  United Kingdom ............... 423/630

Primary Examiner—H. T. Carter
Attorney, Agent, or Firm—Larson and Taylor

[57] ABSTRACT

This invention relates to aluminium compounds and their preparation.

In accordance with the invention a peptizable alumina hydrate is prepared by hydrolyzing an aluminium alkoxide at a water:aluminium ratio at or near the stoichiometric value. One example of an aluminium alkoxide which has been hydrolyzed in accordance with the present invention is aluminium sec-butoxide (Al(OC$_4$H$_9$)$_3$$^s$); thus alkoxide has been hydrolyzed at water:aluminium ratios of 3:1 and 4:1 to give peptizable alumina hydrates.

Cold water (e.g. at 16°–22° C.) and aluminium alkoxide are preferably brought together to effect the hydrolysis.

6 Claims, No Drawings

PROCESS FOR PRODUCING ALUMINIUM CONTAINING SOLS

The present invention relates to materials and the preparation thereof and more particularly to aluminium compounds and the preparation thereof.

According to one aspect of the present invention there is provided a process for the preparation of a peptisable alumina hydrate comprising hydrolysing an aluminium alkoxide at a water:aluminium ratio at or near the stoichiometric value (as hereinafter defined).

Preferably the hydrolysing of the aluminium alkoxide is effected by bringing together a controlled amount of cold water and a controlled amount of the aluminium alkoxide.

The temperature of the cold water is conveniently that of ambient room temperature, for example, 16°–22° C.

It will be understood that the "stoichiometric value" for the water:aluminium ratio is, of course, that required by the hydrolysis reaction concerned. For example, in the case of the reaction:

$$Al(OR)_3 + 3H_2O \rightarrow Al(OH)_3 + 3ROH$$

(where R is an alkyl group) the stoichiometric value of the water:aluminium ratio is 3:1.

The term "near the stoichiometric value" as used in this Specification means at a water:aluminium ratio at which the bringing together of cold water and an aluminium alkoxide gives rise to a peptisable alumina hydrate.

The range of water:aluminium ratios which achieve this can be determined by experiment for a particular aluminium alkoxide.

In the case of aluminium sec-butoxide, for example, it has been found in accordance with the present invention that hydrolysis at a water:aluminium ratio of 6:1 results in a non-peptisable product whereas, in contrast, hydrolysis at a water:aluminium ratio of 3:1 and 4:1 results in a peptisable alumina hydrate.

Examples of aluminium alkoxides which may be hydrolysed in accordance with the present invention are aluminium sec-butoxide ($Al(OC_4H_9)_3{}^s$) and aluminium isopropoxide ($Al(OC_3H_7)_3{}^i$).

The hydrolysis of aluminium alkoxides is discussed in an article entitled "Alumina Sol Preparation from Alkoxides" by B. E. Yoldas in American Ceramic Society Bulletin Vol. 54, No. 3 (1975) pages 289 and 290. In this article it is stated that when aluminium alkoxides are hydrolysed with hot water, a stable, crystalline monohydroxide forms. It is further stated, however, that when the hydrolysis is performed with cold water the resultant monohydroxide is largely amorphous and converts to the trihydroxide, bayerite. The article states that only the monohydroxide forms can be peptised.

The water:alumina ratios reported in the article indicate that a large excess of water was used in the hydrolysis. For example reference is made to using 1 mole of $Al(OC_4H_9)_3{}^s$ with 100 moles of water (i.e. a water:aluminium ratio of 100:1).

In accordance with the present invention cold water and an aluminium alkoxide can be brought together to give, surprisingly, a peptisable alumina hydrate by arranging for the water:aluminium ratio to be at or near the stoichiometric value.

The peptisable alumina hydrate prepared by the hydrolysing process may be optionally dried to give a peptisable product comprising dried alumina hydrate.

The present invention also provides a peptisable alumina hydrate whenever prepared by a process in accordance with the present invention.

Peptisable alumina hydrates in accordance with the present invention may be applied to the preparation of gels and ceramic products. (For example, sols may be formed from the peptisable alumina hydrate, the sols dried to give gels and the gels heated to give ceramic oxide products).

The present invention will now be further described, by way of example only, as follows wherein Examples 1 to 5 are in accordance with the present invention and Example 6 is a comparative example.

EXAMPLE 1

22 g of cold water (22° C.) were added with stirring over a period of 5 seconds to 100 g $Al(OC_4H_9)_3{}^s$). Alcohol vapour was evolved and a white paste formed. The mole ratio of added water to aluminium ($H_2O:Al$) was 3:1 which corresponds to the stoichiometric value for the reaction represented by the equation:

$$Al(OC_4H_9)_3{}^s + 3H_2O \rightarrow Al(OH)_3 + 3C_4H_9OH^s$$

The white paste was dried at room temperature (22° C.) to give a white alumina hydrate powder.

EXAMPLE 2

Approximately 50 g of the white powder prepared in accordance with Example 1 were stirred into ~100 cm³ $H_2O$, the resulting mixture was heated to 100° C. and 4M nitric acid added until an almost colourless sol was produced. On cooling a viscous sol, which was difficult to pour, was obtained having the following properties: density 1.20 g cm$^{-3}$, Al concentration, 4.0M $NO_3/Al$ mole ratio 0.27.

EXAMPLE 3

A clear gel was produced by drying the sol produced in accordance with Example 2 at 100° C.

This gel was redispersible in water.

EXAMPLE 4

29.3 g of cold water (22° C.) were added with slurry over a period of 5 seconds to 100 g of $Al(OC_4H_9)_3{}^s$.

Alcohol vapour was evolved and a white paste was formed.

The mole ratio of added water to aluminium ($H_2O:Al$) was 4:1.

The white paste thus produced was dried at room temperature (22° C.) for 48 hours to give a white alumina hydrate powder.

EXAMPLE 5

Approximately 50 g of the white powder prepared in accordance with Example 4 were stirred into ~100 cm³ of water, the resulting mixture was heated to 100° C., and 4M $HNO_3$ added until an almost colourless sol was produced.

On cooling a viscous sol, which was difficult to pour was produced having the following properties: density 1.18 g cm$^{-3}$, Al concentration 3.2M, $NO_3/Al$ mole ratio of 0.25.

EXAMPLE 6

44 g of cold water (22° C.) were added with stirring over a period of 5 seconds to 100 g of $Al(OC_4H_9)_3{}^s$.

Alcohol vapour was evolved and a white paste formed. The mole ratio of added water to aluminium ($H_2O:Al$) was 6:1. This paste was more fluid than the paste of Examples 1 and 4.

The white paste was dried at room temperature (22° C.) for 48 hours to give a white powder.

50 g of the white powder was stirred into ~100 cm$^3$ of water, the resulting mixture heated to 100° C. and 4M nitric acid added. Nitric acid addition was continued up to a $NO_3:Al$ mole ratio of ~1, but peptisation could not be effected. Drying of this mixture, which was a slurry having an $NO_3:Al$ ratio of ~1, at 100° C. produced a white powder which was not dispersible in water.

I claim:

1. A process for the preparation of a sol of an aluminum compound comprising:

bringing together cold water and an aluminum alkoxide to form a reaction mixture consisting essentially of water and aluminum alkoxide, the amounts of water and aluminum alkoxide in the reaction mixture being such that the water:alumium ratio is at or near stoichiometric; allowing the water and aluminum alkoxide to react to produce a peptisable aluminum hydrate; and peptising the peptisable aluminum hydrate with a peptising agent in aqueous medium to produce a sol of an aluminum compound.

2. A process as claimed in claim 1 wherein the water:aluminium ratio is 3:1.

3. A process as claimed in claim 1 wherein the aluminium alkoxide is selected from the group consisting of aluminium sec-butoxide ($Al(OC_4H_9)_3{}^s$) and aluminium isopropoxide ($Al(OC_3H_7)_3{}^i$).

4. A process as claimed in claim 1 wherein the aluminium alkoxide. is aluminium sec-butoxide and the water:aluminium ratio is 4:1.

5. A process as claimed in claim 1 including the further step of drying the peptisable alumina hydrate to give a peptisable product comprising dried alumina hydrate.

6. A method according to claim 1 wherein said peptising agent comprises nitric acid.

* * * * *